United States Patent
Mutou et al.

(10) Patent No.: US 6,239,824 B1
(45) Date of Patent: May 29, 2001

(54) APPARATUS AND METHOD FOR FORMING IMAGE WITH SUPERIOR IMAGE REPRODUCIBILITY

(75) Inventors: Yoshinori Mutou, Kitakatsuragi-gun; Tetsuro Toyoshima, Soraku-gun; Tadashi Iwamatsu, Nara; Nobuyuki Azuma, Ibaraki; Yoshinori Nakajima, Joyo, all of (JP)

(73) Assignee: Sharp Kabushiki Kaisha

( * ) Notice: Subject to any disclaimer, the term of this patent is extended or adjusted under 35 U.S.C. 154(b) by 0 days.

(21) Appl. No.: 09/591,607

(22) Filed: Jun. 9, 2000

(30) Foreign Application Priority Data

Jun. 11, 1999 (JP) .................................. 11-165723

(51) Int. Cl.⁷ .......................... G03G 15/04; G03B 27/72; H04N 1/04
(52) U.S. Cl. ........................ 347/131; 347/253; 358/1.9
(58) Field of Search ................... 347/131, 132, 347/133, 251, 252, 253; 358/1.9, 298

(56) References Cited

U.S. PATENT DOCUMENTS

| | | | |
|---|---|---|---|
| 5,021,807 | * | 6/1991 | Kinoshita ........................ 347/253 |
| 5,023,632 | * | 6/1991 | Yamamoto et al. .............. 347/119 |
| 5,412,408 | | 5/1995 | Itoh et al. ........................ 347/132 |
| 5,493,324 | * | 2/1996 | Goto et al. ....................... 347/252 |
| 5,742,324 | * | 4/1998 | Suzuki ............................. 347/247 |
| 5,818,504 | * | 10/1998 | Chung et al. .................... 347/251 |
| 5,835,123 | * | 11/1998 | Chung et al. .................... 347/251 |

FOREIGN PATENT DOCUMENTS

| | | |
|---|---|---|
| 58-152269 | 9/1983 | (JP) . |
| 63-64763 | 3/1988 | (JP) . |
| 7-61036 | 3/1995 | (JP) . |
| 10-138566 | * 5/1998 | (JP) . |
| 2893133 | 3/1999 | (JP) . |

* cited by examiner

*Primary Examiner*—Joan Pendegrass
(74) *Attorney, Agent, or Firm*—Dike, Bronstein, Roberts & Cushman; David G. Conlin (57) ABSTRACT

An exposure energy control unit of an image forming apparatus controls exposure energy density $E_{dot}$ ($\mu J/cm^2$) to be applied to an isolated one-dot pattern of image information to satisfy a relation $$-0.11P+6.4 \leq E_{dot}/E_{line} \leq -0.2P+10.7$$

where $E_{line}$ ($\mu J/cm^2$) represents exposure energy density applied to a line pattern of the image information having lines on every second lines and P ($\mu m$) represents dot pitch. Accordingly, image reproducibility of both of a periodic line pattern and an isolated dot pattern can be enhanced without decreasing the film thickness of a photoreceptor even if the resolution is high.

6 Claims, 8 Drawing Sheets

$D = \sqrt{2}\,P$

FIG. 10B $D = 2P$

FIG. 10C $D = 2\sqrt{2}\,P$

APPARATUS AND METHOD FOR FORMING IMAGE WITH SUPERIOR IMAGE REPRODUCIBILITY

BACKGROUND OF THE INVENTION

1. Field of the Invention

The present invention relates to image forming apparatuses and methods for forming an image based on a digital image. In particular, the invention relates to an image forming apparatus and an image forming method for forming a high-quality image by controlling exposure energy density.

2. Description of the Background Art

Image forming apparatuses represented by copiers and printers are requested these days to be more excellent in the image quality and reproducibility. In order to meet this request, regarding a digital image forming apparatus of the electrophotography system, a method has been proposed according to which the diameter of a spot formed on a photoreceptor is optimized for a dot pitch determined by resolution.

For example, Japanese Patent Laying-Open No. 58-152269 discloses a technique of optimizing exposure energy with respect to a relational expression of dot pitch, diameter of exposure spot, and exposure energy density. Japanese Patent Laying-Open No. 7-61036 discloses a technique of not only optimizing a spot diameter for a dot pitch but additionally considering photoreceptor characteristics to obtain a high-quality image.

In addition to the technique of optimizing a spot diameter, a method is proposed for improving the quality of an image by image processing.

Japanese Patent Laying-Open No. 63-64763 discloses a technique of achieving reproducibility for an isolated dot by detecting isolated one-dot print data from print data and correcting one bit preceding or following the detected data as the one-dot print data so as to improve the image quality.

However, if these techniques are applied to an image forming apparatus with a high resolution such as the one which exceeds 600 dpi, it is difficult to achieve a superior reproducibility for images having different dot densities.

Specifically, a problem in the techniques disclosed respectively in Japanese Patent Laying-Open Nos. 58-152269 and 7-61036 is that, if the resolution is ensured of a line pattern with a relatively high dot density, for example, having lines on every second lines (hereinafter referred to as "periodic line pattern"), the diameter of a dot in an isolated one-dot pattern having a low dot density (hereinafter referred to as "isolated dot pattern") is smaller than a desired value or the dot itself is not formed in some cases.

On the contrary, if the dot diameter of the isolated dot pattern is set at a value appropriate for resolution, the line width of the periodic line pattern increases and a contrast corresponding to the resolution cannot be ensured.

Therefore, it is highly difficult for an image forming apparatus with a high resolution to obtain an excellent reproducibility for both of the periodic line pattern and the isolated dot pattern merely by adjusting the diameter of a spot formed on a photoreceptor, and accordingly to obtain an output image with a superior reproducibility.

According to the technique disclosed in Japanese Patent Laying-Open No. 63-64763, print data is changed (corrected) so that the isolated dot pattern itself can be reproduced. However, the reproduced image is not exactly the original image. Further, the reproduced image could have an unnatural portion depending on cases. Therefore, this technique does not provide a fundamental solution to the issue of ensuring a superior reproducibility for both of the periodic line pattern and the isolated dot pattern as described above.

It is noted that the issue of ensuring an excellent reproducibility for both of the periodic line pattern and the isolated dot pattern relates not only to the resolution but to a difference of sensitivity, i.e., photoconductivity of the photoreceptor. Considering this, it could be possible to achieve such an excellent reproducibility for both of the periodic line pattern and the isolated dot pattern by decreasing the film thickness of the photoreceptor, for example.

However, the decrease in the film thickness of the photoreceptor results in deterioration of dark decay and sensitivity characteristics due to deterioration by wear caused by repeated use. A problem then arises concerning durability. A further problem regarding gradation which is not negligible is that a photoreceptor having a small film thickness cannot provide a satisfactory gradation.

SUMMARY OF THE INVENTION

One object of the present invention is to provide an image forming apparatus and an image forming method which can enhance an image reproducibility for both of the periodic line pattern and the isolated dot pattern without decreasing the film thickness of a photoreceptor, even if the resolution is high.

This object of the invention is achieved by an image forming apparatus having following components. Specifically, the image forming apparatus according to one aspect of the invention includes an exposure unit for exposing a photoreceptor charged to a predetermined potential to light, a control unit for controlling exposure energy density of the exposure unit based on image information, and a development unit for visualizing an electrostatic latent image formed on the photoreceptor by the exposure unit. The control unit controls exposure energy density $E_{dot}$ ($\mu J/cm^2$) to be applied to an isolated one-dot pattern of the image information to satisfy the following relation, $$-0.11P+6.4 \leq E_{dot}/E_{line} \leq -0.2P+10.7$$

where $E_{line}$ ($\mu J/cm^2$) represents exposure energy density to be applied to a line pattern of the image information having lines on every second lines and P ($\mu m$) represents dot pitch.

According to the present invention, exposure energies to be applied respectively to the periodic line pattern and the isolated dot pattern are optimized. Consequently, it is possible to provide an image forming apparatus capable of improving an image reproducibility for both of the periodic line pattern and the isolated dot pattern without decreasing the film thickness of the photoreceptor even if the resolution is high.

Preferably, the image forming apparatus further includes a detection unit for detecting an isolated one-dot pattern from the image information. The control unit applies the exposure energy density $E_{line}$ ($\mu J/cm^2$) when no isolated one-dot pattern is detected, and applies the exposure energy density $E_{dot}$ ($\mu J/cm^2$) when the isolated one-dot pattern is detected.

In this way, a predetermined exposure energy density $E_{line}$ ($\mu J/cm^2$) is applied when no isolated dot pattern is detected and an exposure energy density $E_{dot}$ ($\mu J/cm^2$) which satisfies a certain condition is applied only when an isolated dot pattern is detected. The reproducibility of the isolated dot pattern can thus be improved by a relatively simple control.

Preferably, the control unit includes a power modulation unit capable of controlling exposure energy density for each dot.

As a result, the exposure energy density can be controlled for each dot according to image information so as to form an image with a superior reproducibility.

Preferably, the image forming apparatus sets an exposure spot diameter D ($\mu$m) of the exposure unit to satisfy the following relation, $$D \leq 2P$$

where P ($\mu$m) represents dot pitch.

The reproducibility can accordingly be ensured for the periodic line pattern.

Still preferably, the photoreceptor has a film thickness of 15 to 25 $\mu$m.

Durability as well as a satisfactory gradation can thus be ensured.

According to another aspect of the invention, a method of forming an image includes the steps of exposing a photoreceptor charged to a predetermined potential to light, controlling exposure energy density of an exposure unit based on image information, and developing an electrostatic latent image formed in the exposing step on the photoreceptor so as to visualize the latent image. In the controlling step, exposure energy density $E_{dot}$ ($\mu$J/cm$^2$) to be applied to an isolated one-dot pattern of the image formation is controlled to satisfy the following relation, $$-0.11P+6.4 \leq E_{dot}/E_{line} \leq -0.2P+10.7$$

where $E_{line}$ ($\mu$J/cm$^2$) represents exposure energy density to be applied to a line pattern of the image information having lines on every second lines and P ($\mu$m) represents dot pitch.

According to the present invention, it is thus possible to provide a method of forming an image capable of enhancing an image reproducibility for both of the periodic line pattern and the isolated dot pattern without decreasing the film thickness of the photoreceptor even if the resolution is high.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described in conjunction with the drawings.

Figure 1:
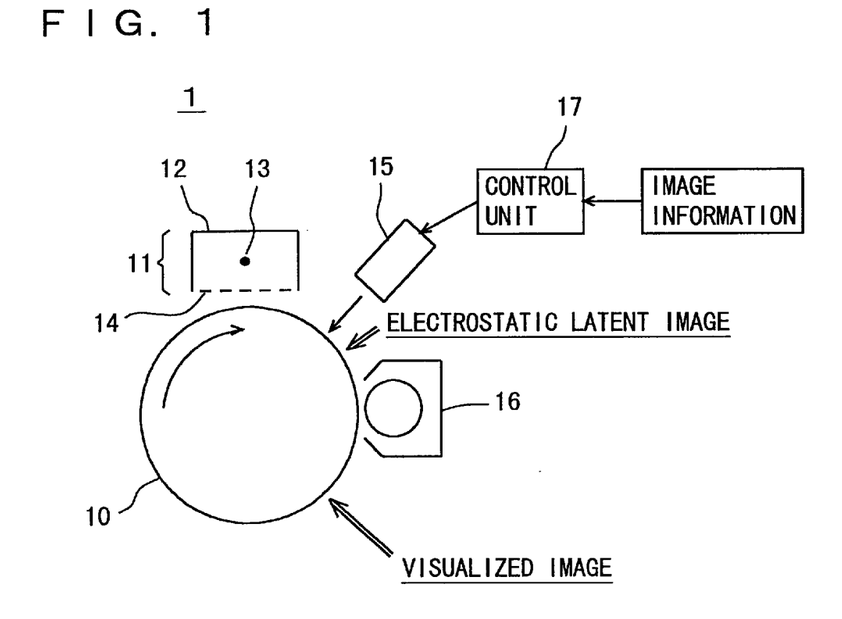
FIG. 1 shows a main structure of an image forming apparatus according to one embodiment of the invention.

Referring to FIG. 1, an image forming apparatus 1 includes a photoreceptor 10 having a photoconductive film on its surface, a charging unit 11 uniformly charging the surface of photoreceptor 10, an exposure unit 15 exposing the surface of photoreceptor 10 to light so as to form an electrostatic latent image, a control unit 17 controlling exposure unit 15 based on image information, a development unit 16 visualizing the electrostatic latent image formed on the surface of photoreceptor 10 by using a developer (toner), a transfer unit (not shown) transferring the toner on the surface of photoreceptor 10 to a sheet of paper, and a fixing unit (not shown) fixing the transferred toner onto the sheet of paper.

Accordingly, on the surface of photoreceptor 10 shown in FIG. 1, an electrostatic latent image is formed between exposure unit 15 and development unit 16 and an image visualized by toner is formed between development unit 16 and the transfer unit (not shown).

Structural components are each described below. Photoreceptor 10 is a laminated type organic photoreceptor having an undercoat layer (UCL), a charge generation layer (CGL), and a charge transport layer (CTL) on a conductor substrate, having its surface capable of being negatively charged The photoreceptor layer has a thickness of 15 to 25 $\mu$m.

Charging unit 11 includes a case 12, a wire 13 and a grid 14 each connected to a high-voltage power supply. Charges released from wire 13 by corona discharge have their numerical values controlled by bias voltage of grid 14. Accordingly, the surface of photoreceptor 10 is charged to a desired surface potential. The distance between the surface of photoreceptor 10 and charging unit 11 (grid 14) is 1 to 2 mm.

Figure 2:
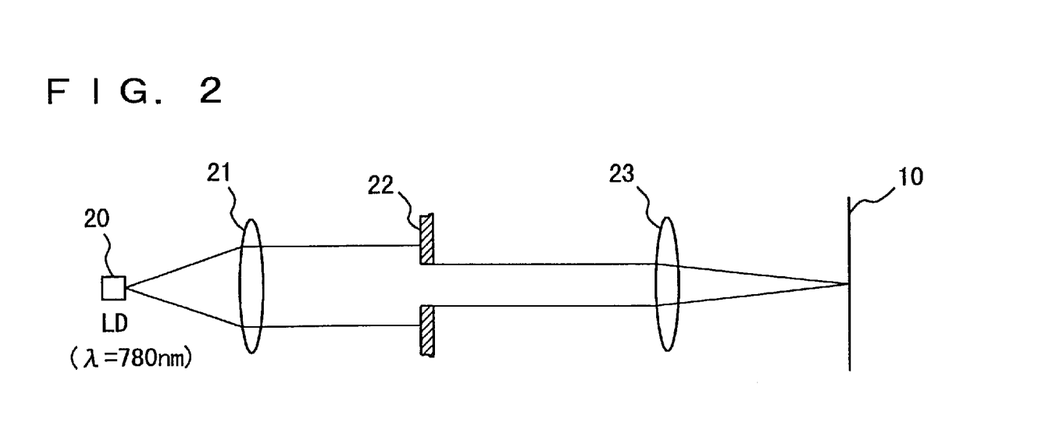
FIG. 2 is a schematic view showing a structure of an exposure unit.

FIG. 2 generally shows a structure of exposure unit 15. Referring to FIG. 2, exposure unit 15 includes an infrared semiconductor laser (LD) 20 serving as a light source with a wavelength of 780 nm, a collimator lens 21 for shaping a laser beam emitted from LD 20 into a parallel beam, an aperture 22 limiting the diameter of the parallel beam passing through collimator lens 21 so as to obtain a desired diameter of an exposure spot, and an objective lens 23 collecting the parallel beam passing through aperture 22 to form a spot on photoreceptor 10.

Driving of LD 20 is controlled by control unit 17. Control unit 17 includes a laser driver (manufactured by KINO MELLES GRIOT CORPORATION) and a power modulation circuit so that the exposure energy density of LD 20 can be adjusted.

Figure 3:
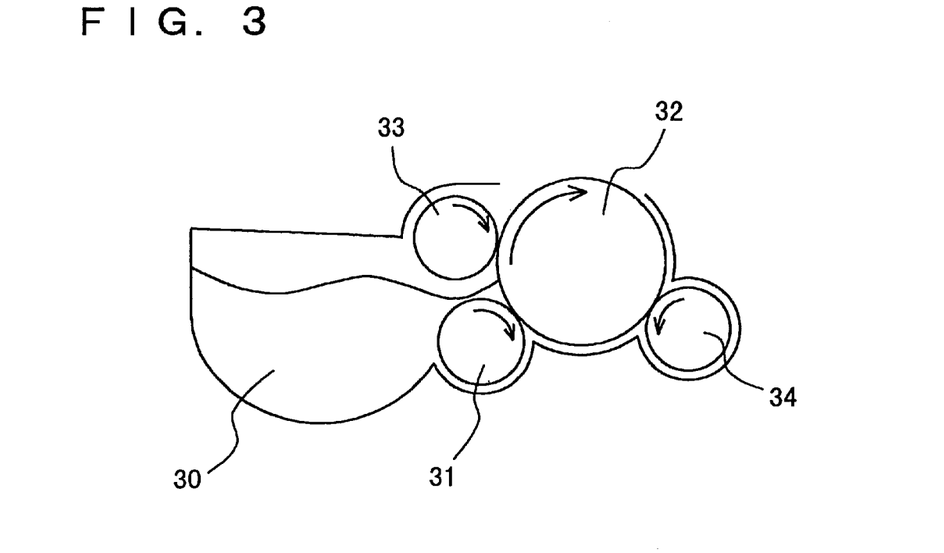
FIG. 3 is a schematic view showing a structure of a development unit.

Development unit 16 employs a nonmagnetic one-component contact development method. FIG. 3 generally shows a structure of development unit 16. Referring to FIG. 3, development unit 16 includes a nonmagnetic one-component toner 30 which is charged, a development roller 32 opposite to photoreceptor 10 that allows a certain amount of toner 30 formed into a layer to be in contact with photoreceptor 10 for the purpose of development, a supply roller 31 for supplying toner 30 reserved in a container to development roller 32, a doctor roller 33 for limiting toner 30 deposited on development roller 32 to a certain amount thereof, and a collection roller 34 for collecting toner 30 left on development roller 32 after the development and returning the collected toner into the container.

Figure 4:
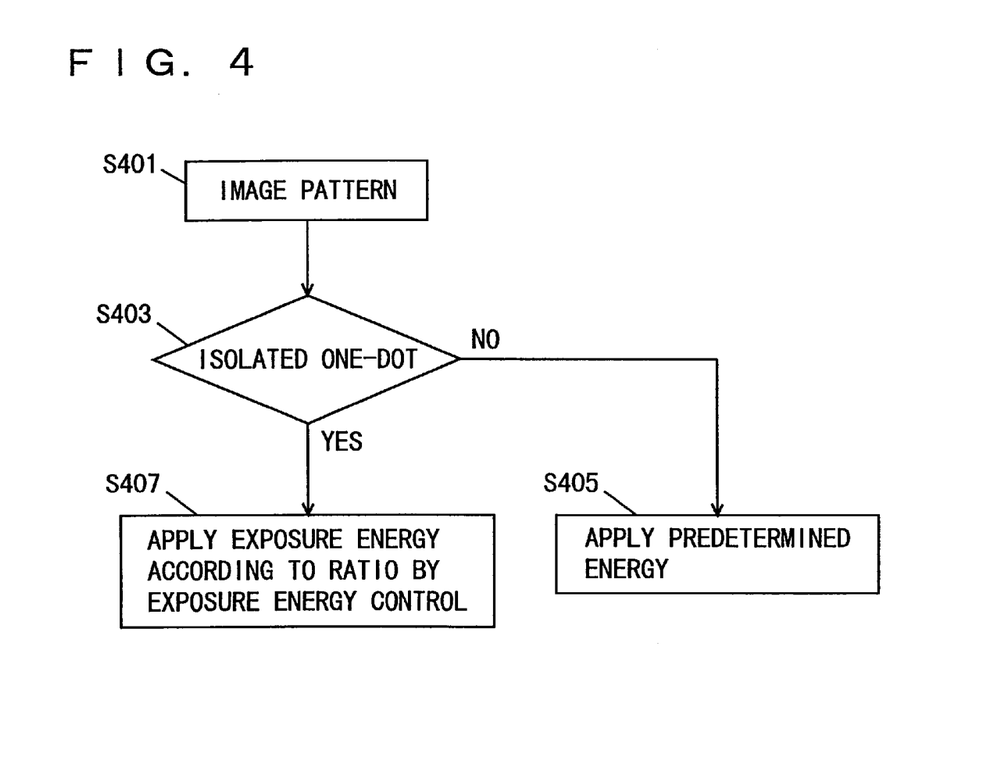
FIG. 4 is a flow chart illustrating a procedure of controlling exposure energy density of a laser by a control unit.

Description of control unit 17 is now given below. FIG. 4 is a flowchart illustrating a procedure of controlling the exposure energy density of LD 20 by control unit 17. Referring to FIG. 4, in step S401, an isolated dot pattern is detected from an image pattern. It is then determined if there is an isolated dot pattern (step S403). If not, a predetermined exposure energy density is applied (step S405). If there is an isolated dot pattern, an exposure energy is determined according to a ratio, and the determined exposure energy is applied by the power modulation circuit (step S407).

The exposure energy $E_{dot}$ according to a ratio here refers to the one which satisfies the following relation, $$-0.11P+3.4 \leq E_{dot}/E_{line} \leq -0.2P+10.7$$

where $E_{line}$ represents an exposure energy to be applied to a periodic line pattern in the image pattern and P represents dot pitch. This relation is derived as follows.

Figure 5:
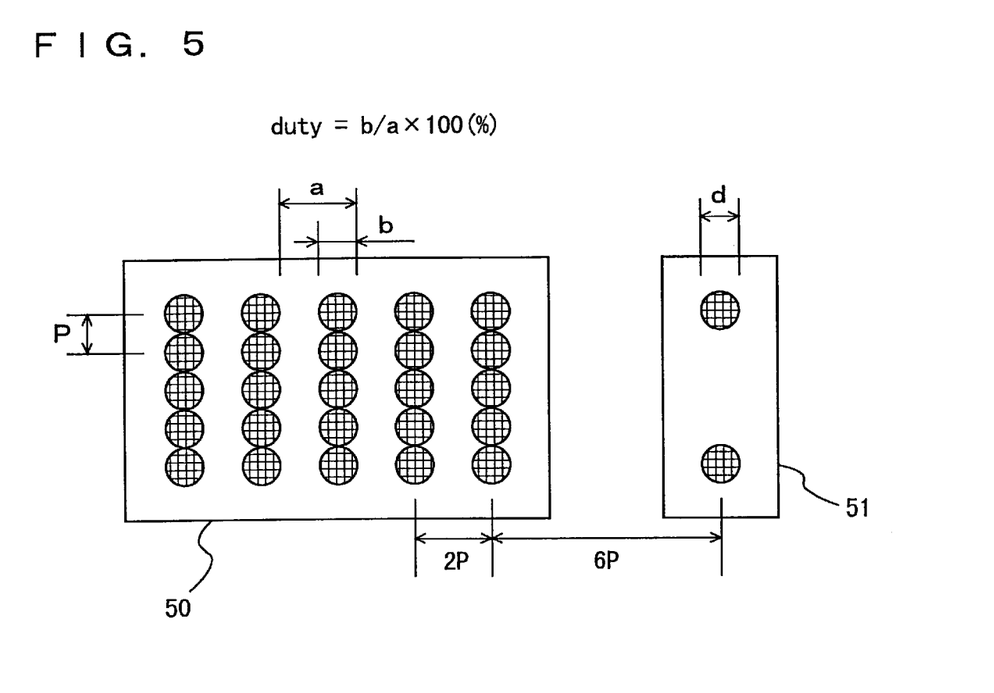
FIG. 5 shows typical periodic line pattern and isolated dot pattern.

FIG. 5 shows a periodic line pattern 50 and an isolated dot pattern 51 as typical examples respectively. Periodic line pattern 50 has lines formed on every second lines, and isolated dot pattern 51 has nonadjacent dots formed being isolated from each other. As shown in FIG. 5, if a dot pitch determined by resolution is P, the interval between lines in periodic line pattern 50 is 2P. The center-to-center distance between the edge line in periodic line pattern 50 and isolated dot pattern 51 is 6P in this example.

As a parameter for evaluating reproducibility of periodic line pattern 50, a ratio (duty) is herein considered between line width b and line interval a (sum of the width of a non-image portion and line width b). An appropriate value of the duty is supposed to be 50% corresponding to the ratio of 1:1 between the width of a non-image portion and the line width b. Reproducibility of isolated dot pattern 51 is evaluated by using dot diameter d. An appropriate value of the dot diameter d is herein supposed to satisfy a relation $P \leq d \leq \sqrt{2}P$ where P represents dot pitch.

These typical patterns shown in FIG. 5 are used as digital image data to conduct an experiment of forming an image by image forming apparatus 1 described above. It is noted that the result of measurement is obtained by measuring for a toner image formed on photoreceptor 10, not an image output to a sheet of paper.

Figure 6A:
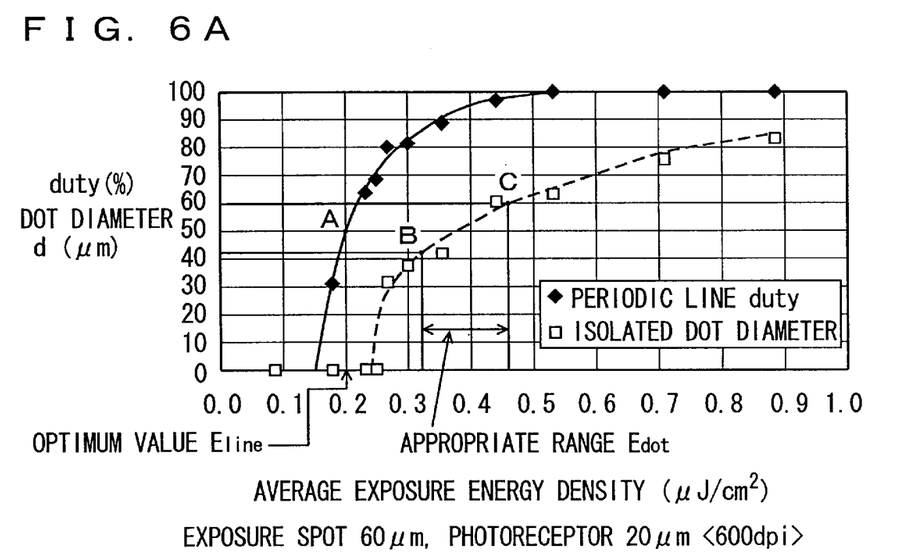
FIGS. 6A and 6B each show result of an experiment regarding dot diameter d and duty relative to an average exposure energy density.
Figure 6B:
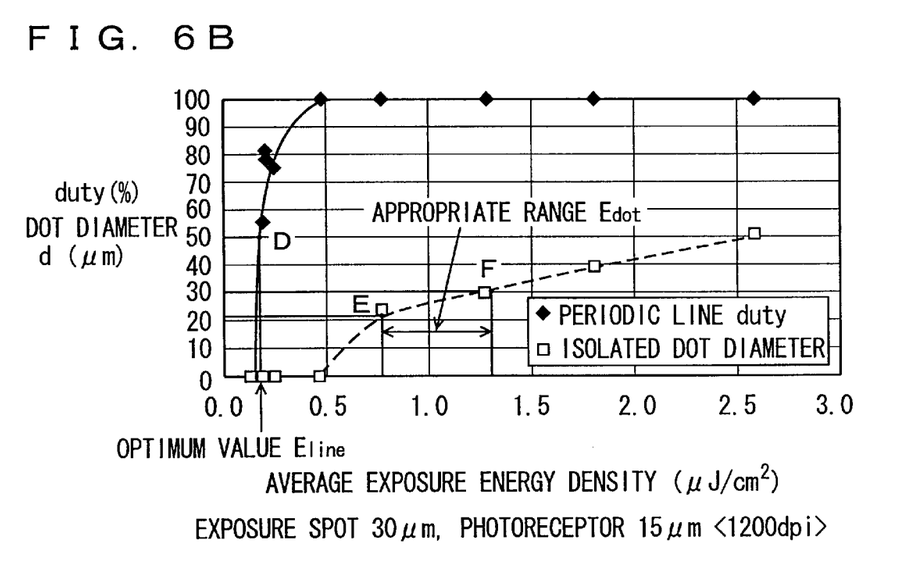

FIGS. 6A and 6B each show result of an experiment regarding the dot diameter d and the duty relative to an average exposure energy density. FIG. 6A shows a result obtained when an image of resolution 600 dpi is formed by using the laser having an exposure spot diameter D of 60 $\mu$m and the photoreceptor having a film thickness of 20 $\mu$m. FIG. 6B shows a result obtained when an image of resolution 1200 dpi is formed by using the laser having an exposure spot diameter D of 30 $\mu$m and the photoreceptor having a film thickness of 15 $\mu$m. In both of FIGS. 6A and 6B, the x-axis represents the average exposure energy density and the y-axis represents the duty and the dot diameter. The curved line having black points represents the duty of the periodic line pattern and the curved line having white points represents the dot diameter d of the isolated dot pattern.

Referring to FIG. 6A, when the duty of periodic line pattern 50 is 50% and accordingly the reproducibility is supposed to be excellent, average exposure energy density $E_{line}$ is approximately 0.2 $\mu$J/cm$^2$ (point A). On the other hand, average exposure energy density $E_{dot}$ when the dot diameter d of isolated dot pattern 51 has an appropriate value ranging approximately from 42 to 59 $\mu$m is approximately 0.32 to 0.462 $\mu$J/cm$^2$ (point B to point C).

It is now understood that if the average exposure energy has a constant value, improvement is difficult of the reproducibility for both of the periodic line pattern and the isolated dot pattern. Further, it is found that exposure energy density $E_{dot}$ to be applied to the isolated dot pattern should be approximately 1.6 to 2.3 times exposure energy density $E_{line}$ applied to the periodic line pattern, for the purpose of enhancing the image reproducibility for both of the periodic line pattern and the isolated dot pattern.

An experiment is further conducted to form an image of resolution 600 dpi by using an exposure spot diameter of 30 $\mu$m and a photoreceptor film thickness of 15 $\mu$m. The result of this experiment also reveals that average exposure energy density $E_{dot}$ which allows the dot diameter d of isolated dot pattern 51 to have an appropriate value is approximately 1.6 to 2.3 times average exposure energy density $E_{line}$ which allows the duty of periodic line pattern 50 to be 50%.

On the other hand, when an image of resolution 1200 dpi is formed as shown in FIG. 6B, average exposure energy density $E_{line}$ which allows the duty of periodic line pattern 50 to be 50% is approximately 0.2 $\mu$J/cm$^2$ (point D), while average exposure energy density $E_{dot}$ which allows the dot diameter d of isolated dot pattern 51 to have an appropriate value ranging from 21 to 30 $\mu$m is approximately as much as about 0.8 to 1.3 $\mu$J/cm$^2$ (point E to point F).

It is accordingly appreciated that enhancement of the reproducibility for both of the periodic line pattern and the isolated dot pattern with the same exposure energy density is further difficult. It is also revealed that enhancement of the image reproducibility for both of the periodic line pattern and the isolated dot pattern requires exposure energy density $E_{dot}$ applied to the isolated dot pattern to be approximately 4 to 6.5 times exposure energy density $E_{line}$ applied to the periodic line pattern.

Experiment is further conducted to form images with resolution of 1200 dpi respectively by using an exposure spot diameter of 30 $\mu$m and a photoreceptor film thickness of 20 $\mu$m and by using an exposure spot diameter of 15 $\mu$m and a photoreceptor film thickness of 15 $\mu$m. These experiments similarly reveal that average exposure energy density $E_{dot}$ which allows the dot diameter d of isolated dot pattern 51 to have an appropriate value is approximately 4 to 6.5 times average exposure energy density $E_{line}$ which allows the duty of periodic line pattern 50 to be 50%.

These results of experiments show that improvement tends to become further difficult of the reproducibility for both of the periodic line pattern and the isolated dot pattern using the same exposure energy density as the resolution increases. It is further revealed that if the resolution is constant and only the photoreceptor film thickness and exposure spot diameter D are changed within a certain range, the relation remains the same between optimum average exposure energy densities $E_{line}$ and $E_{dot}$ for the periodic line pattern 50 and the isolated dot patter 51 respectively.

Accordingly, it is turned out that a relation (ratio) between average exposure energy density $E_{line}$ allowing the duty of periodic line pattern 50 to be 50% and average exposure energy density $E_{dot}$ allowing the dot diameter d to have an appropriate value can be represented only by dot pitch P determined by the resolution. This relation is determined from the results of experiments described above as follows.

$$-0.11P+6.4 \leq E_{dot}/E_{line} \leq -0.2P+10.7 \quad (1)$$

Figure 7:
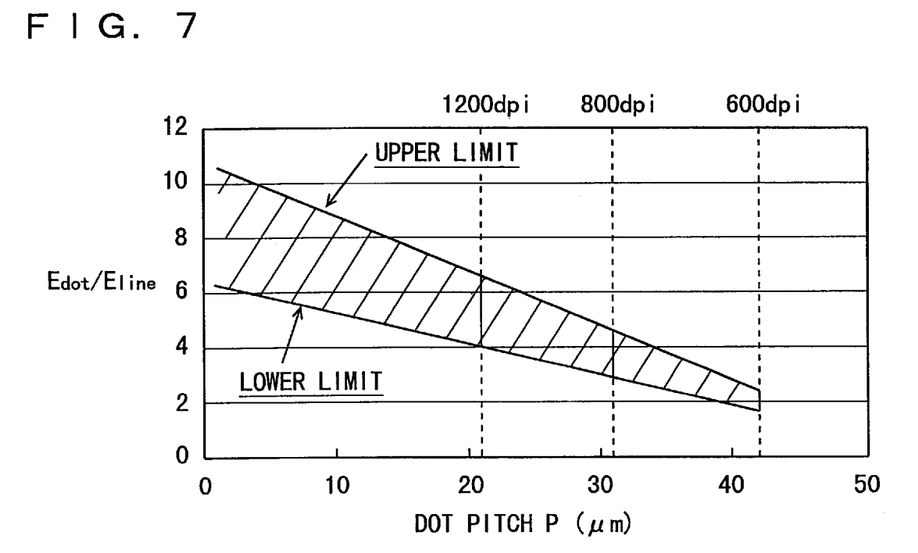
FIG. 7 shows $E_{dot}/E_{line}$ relative to dot pitch P.

FIG. 7 shows $E_{dot}/E_{line}$ with respect to dot pitch P. The x-axis represents dot pitch P and the y-axis represents $E_{dot}/E_{line}$. There are the upper limit and the lower limit because the appropriate value of the dot diameter d of the isolated dot pattern 51 has a certain range as described above. This graph shows that improvement of the reproducibility for both of the periodic line pattern and the isolated dot pattern is achieved with the same exposure energy density only when a relation $E_{dot}/E_{line} \leq 1$ is established.

If an image has a high resolution of at least 600 dpi, in other words, has a dot pitch of 42 μm or less, $E_{dot}/E_{line}$ is at least 1. It is accordingly understood that the exposure energy density should be changed for the periodic line pattern and the isolated dot pattern. In this case, the relation shown in FIG. 7 may be utilized. Specifically, the value of $E_{dot}$ may be controlled to satisfy the relation (1) with respect to $E_{line}$.

In order to confirm that the condition thus derived is correct, an experiment is further conducted regarding the reproducibility by using image forming apparatus 1 and controlling the exposure energy density to be in the range satisfying the relation (1) above. Specifically, images of resolution 600 dpi and 1200 dpi are formed by setting $E_{dot}/E_{line}$ at 2 and at 6 respectively. Consequently, both images can be formed with an excellent reproducibility. An experiment is further conducted for confirmation by forming an image of resolution 800 dpi with $E_{dot}/E_{line}$ set at 4. The result is satisfactory.

Figure 8A:
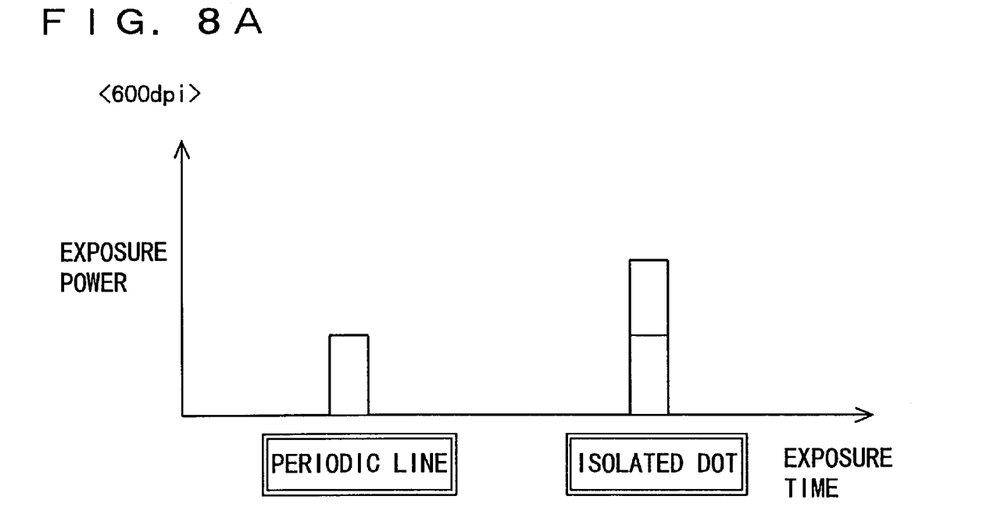
FIGS. 8A and 8B illustrate a power modulation circuit for modulating the exposure energy density used by the control unit.
Figure 8B:
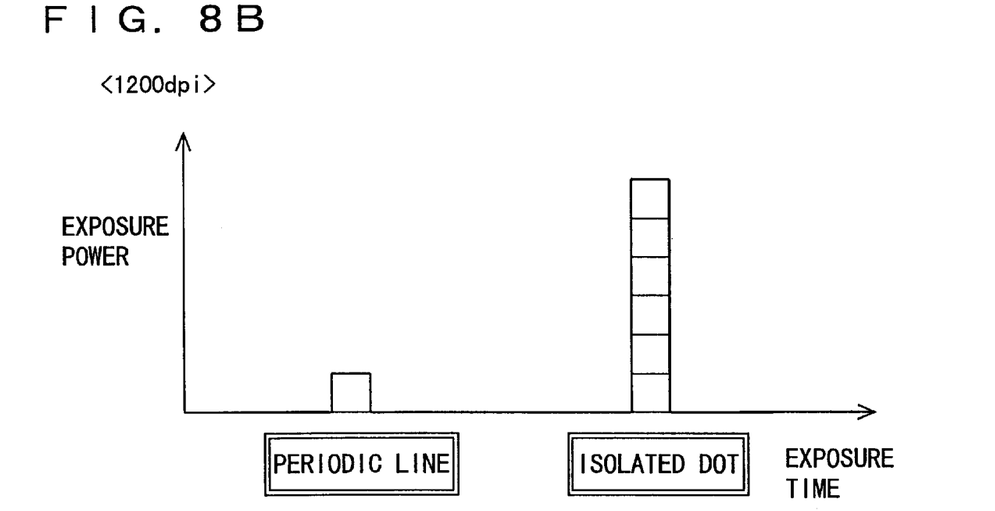

FIGS. 8A and 8B are presented to explain a power modulation circuit for modulating the exposure energy density used by control unit 17. The exposure energy is proportional to the product of exposure time and laser power. Therefore, the exposure power should be adjusted if the exposure time (pulse width) is made constant as shown in FIGS. 8A and 8B.

FIG. 8A shows exposure power to be applied to the periodic line pattern and that applied to the isolated dot pattern when an image of resolution 600 dpi is formed. In order to establish the relation $E_{dot}/E_{line}=2$, the exposure power applied to the isolated dot pattern may be twice the exposure power applied to the periodic line pattern. Similarly, when an image of resolution 1200 dpi is formed as shown in FIG. 8B, the exposure power applied to the isolated dot pattern may be six times that applied to the periodic line pattern with a constant pulse width.

Figure 9A:
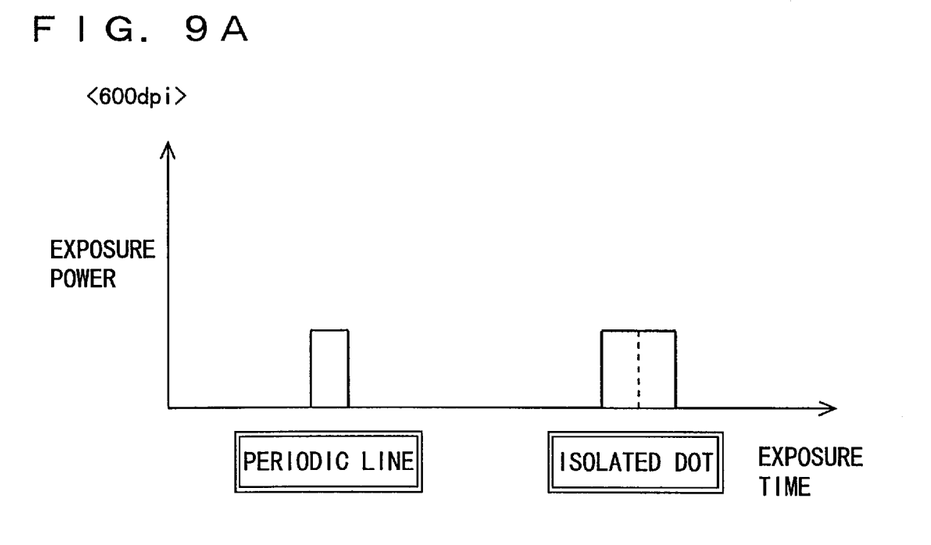
FIGS. 9A and 9B illustrate a pulse width modulation method for modulating the exposure energy density used by the control unit.
Figure 9B:
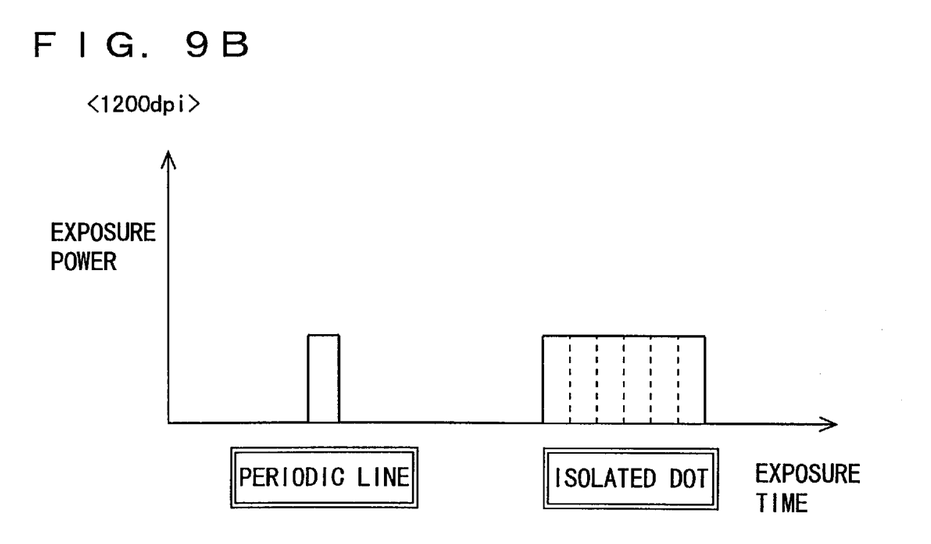

It is noted that the exposure energy density may be modulated according to the pulse width modulation method as shown in FIGS. 9A and 9B according to which the exposure power is made constant while the exposure time is varied. If an image of resolution 600 dpi is formed, the pulse width for the isolated dot pattern may be set twice the pulse width for the periodic line pattern as shown in FIG. 9A. Similarly, if an image of resolution 1200 dpi is formed, the pulse width for the isolated dot pattern may be set six times that for the periodic line pattern as shown in FIG. 9B. Alternatively, the power modulation and the pulse modulation may be combined to control the exposure energy density.

As discussed above, when the photoreceptor has a film thickness of 15 to 25 μm, the reproducibility for both of periodic line pattern 50 and isolated dot pattern 51 cannot be enhanced if the same exposure energy is applied to both patterns. In order to address this issue, the exposure energy density can be controlled according to the above relation (1) so as to apply an optimum energy. Consequently, an enhanced reproducibility can be ensured for both patterns without decreasing the film thickness of the photoreceptor.

A relation between dot pitch P determined by resolution and spot diameter D is described below. The spot diameter refers to a diameter of a spot formed on photoreceptor 10 by a laser beam emitted from LD 20 in FIG. 2, the diameter determined when the distribution of light intensity corresponds to $1/e^2$ of a peak value (center).

Figure 10A:
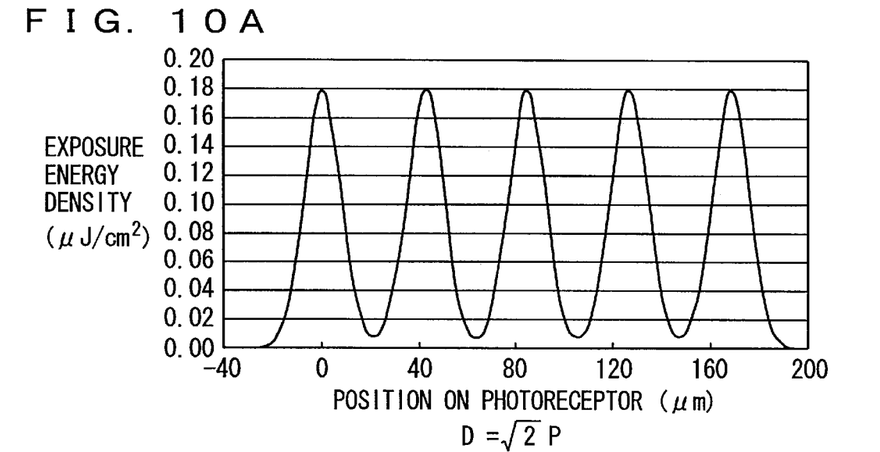
FIGS. 10A to 10C each show a distribution of the exposure energy density on a photoreceptor in the direction perpendicular to a line of a periodic line pattern when dot pitch P is constant while spot diameter D is changed.
Figure 10B:
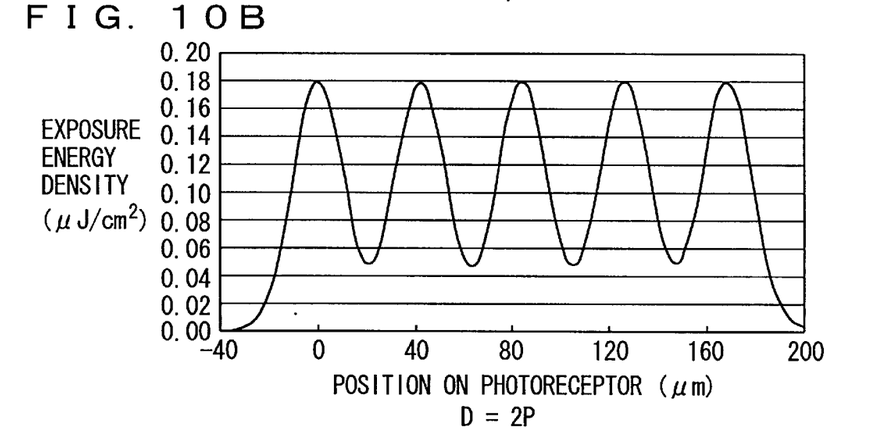
Figure 10C:
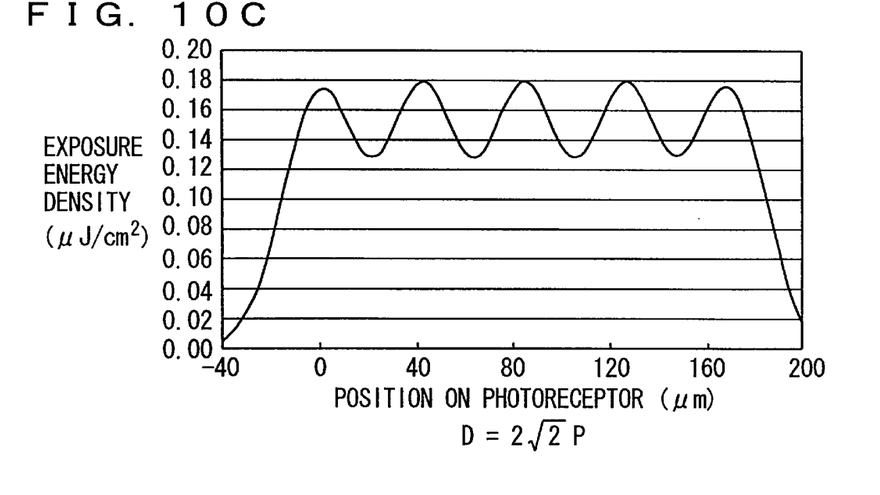

FIGS. 10A to 10C show distribution of exposure energy density over the photoreceptor with respect to a direction perpendicular to the line of periodic line pattern 50 when dot pitch P is constant while spot diameter D is changed. It is supposed here that this distribution of the exposure energy density follows latent image potential on the photoreceptor.

The spot diameter D is set at $\sqrt{2}P$, 2P, and $2\sqrt{2}P$ respectively in FIGS. 10A, 10B and 10C. In all cases, the resolution is 1200 dpi or the dot pitch P is 21 μm. The five peaks of the waveform shown in each of FIGS. 10A to 10C each correspond to the center of a line of the periodic line pattern 50, and the interval P of the peaks is 42 μm.

Regarding the distribution of the exposure energy density when the spot diameter D is $\sqrt{2}P$ (FIG. 10A), there is an apparent difference between exposure energy density applied to an image portion (peak portion of the waveform) and a non-image portion (trough portion of the waveform). It is accordingly seen that a contrast of latent image potentials (difference between the value at the non-image portion in the gap of the periodic line and the value at the peak) is sufficient for the periodic lines. The contrast slightly decreases when the spot diameter D is 2P (FIG. 10B) and remarkably decreases when the spot diameter D is $2\sqrt{2}P$ (FIG. 10C).

In other words, the greater the exposure spot diameter D, the more considerable the effect of overlapping spots adjacent to each other. Consequently, the contrast of latent image potentials for the periodic lines decreases. Specifically, if the contrast obtained when there is no overlapping of exposure spots is 100%, the contrast decreases to as low as 28% if the spot diameter D is $2\sqrt{2}P$ (FIG. 10C).

If the latent image potential contrast decreases, the change of the duty relative to the change of the exposure energy density is drastic, making it difficult to obtain an intermediate duty (0<duty<100).

The spot diameter D of $2\sqrt{2}P$ is actually used to form periodic line pattern 50. It is accordingly confirmed the resultant image is a solid black image having no non-image portion. On the other hand, when the spot diameter D is set at $\sqrt{2}P$ (contrast 96%) and 2P (contrast 73%), the intermediate duty could be reproduced with respect to the exposure energy and periodic line pattern 50 having a satisfactory contrast can be formed.

Then, the exposure spot diameter D is preferably equal to or less than 2P (P is dot pitch) ($D \leq 2P$). In this way, deterioration of an image quality caused by overlapping of exposure spots on adjacent pixels can be avoided.

Although development unit 16 of image forming apparatus 1 employs the one-component development method, the development method is not limited thereto and other development methods such as two-component development and jumping development may be employed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising
   an exposure unit for exposing a photoreceptor charged to a predetermined potential to light;
   a controller for controlling exposure energy density of said exposure unit based on image information; and
   a development unit for visualizing an electrostatic latent image formed on said photoreceptor by said exposure unit, wherein
   said controller controls exposure energy density $E_{dot}$ (μJ/cm$^2$) to be applied to an isolated one-dot pattern of said image information to satisfy a relation $$-0.11P + 6.4 \leq E_{dot}/E_{line} \leq -0.2P + 10.7$$

where $E_{line}$ (82 J/cm$^2$) represents exposure energy density to be applied to a line pattern of said image information having lines on every second lines and P(μm) represents dot pitch.

2. The image forming apparatus according to claim 1, further comprising a detection unit for detecting an isolated one-dot pattern from said image information, wherein said controller applies exposure energy density $E_{line}$ ($\mu$J/cm$^2$) when said isolated one-dot pattern is not detected and applies $E_{dot}$ ($\mu$J/cm$^2$) when said isolated one-dot pattern is detected.

3. The image forming apparatus according to claim 1, wherein said controller includes a power modulation unit for controlling exposure energy density for each dot.

4. The image forming apparatus according to claim 1, wherein exposure spot diameter D ($\mu$m) of said exposure unit is set to satisfy a relation $$D \leq 2P$$

where P ($\mu$m) represents dot pitch.

5. The image forming apparatus according to claim 1, wherein said photoreceptor has a film thickness of 15 to 25 $\mu$m.

6. A method of forming an image comprising the steps of:

exposing a photoreceptor charged to a predetermined potential to light;

controlling exposure energy density of an exposure unit based on image information; and developing an electrostatic latent image formed on said photoreceptor in said exposing step so as to visualize the latent image, wherein in said controlling step, exposure energy density $E_{dot}$ ($\mu$J/cm$^2$) to be applied to an isolated one-dot pattern of said image information is controlled to satisfy a relation $$-0.11P+6.4 \leq E_{dot}/E_{line} \leq -0.2P+10.7$$

where $E_{line}$ ($\mu$J/cm$^2$) represents exposure energy density to be applied to a line pattern of said image information having lines on every second lines and P ($\mu$m) represents dot pitch.

\* \* \* \* \*